Dec. 23, 1930.    A. E. PRARAT    1,786,126
CHICKEN NEST
Filed Oct. 10, 1928    2 Sheets-Sheet 2
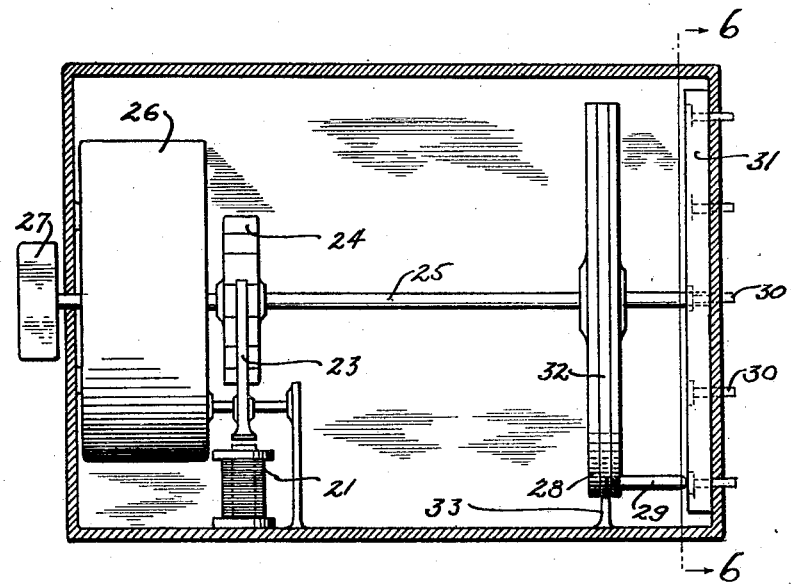
Fig. 5.
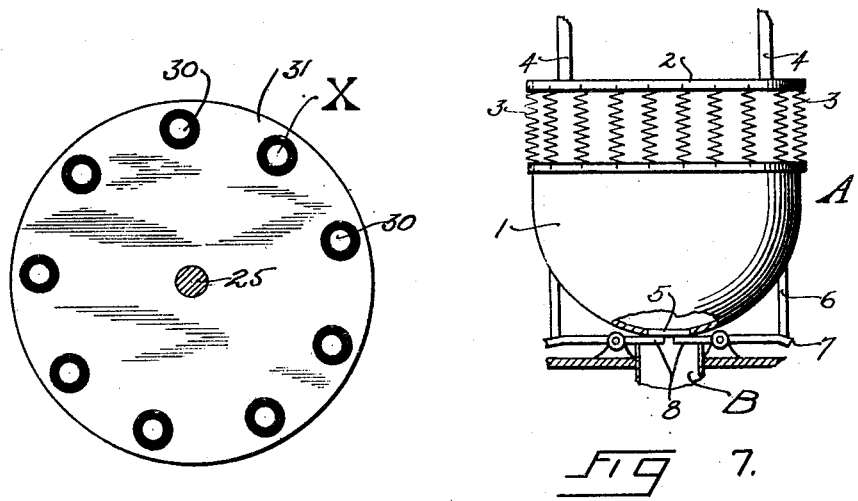
Fig. 6.
Fig. 7.
INVENTOR.
Alfred E. Prarat
BY
ATTORNEYS.

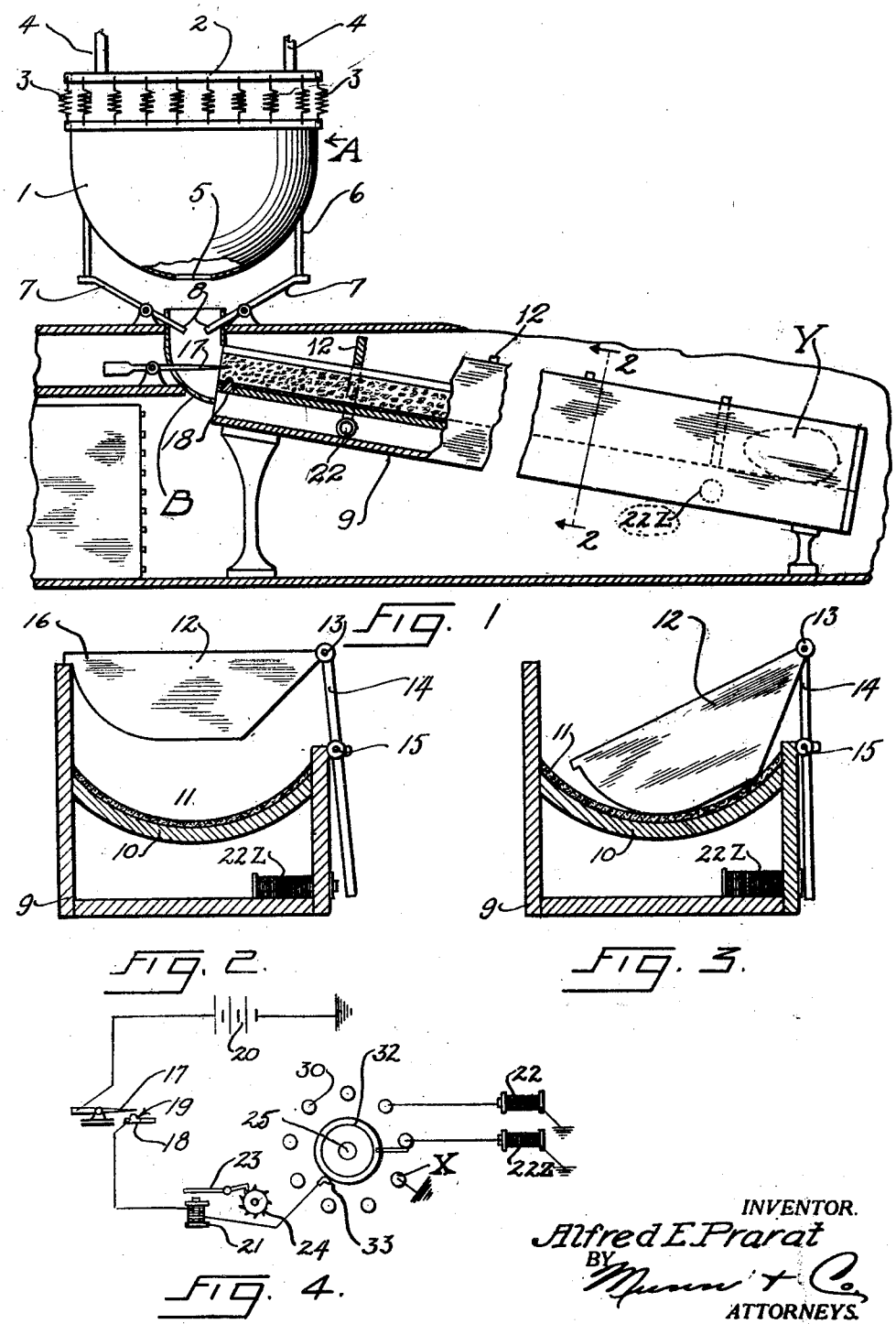

Patented Dec. 23, 1930

1,786,126

UNITED STATES PATENT OFFICE

ALFRED E. PRARAT, OF GRIDLEY, CALIFORNIA

CHICKEN NEST

Application filed October 10, 1928. Serial No. 311,693.

My invention relates to improvements in chicken nests, and it consists of the combinations, constructions and arrangement of parts hereinafter described and claimed.

An object of my invention is to provide a chicken nest in which novel means is provided for conveying the egg away from the nest after it is laid, and for confining each egg in a separate compartment. The device operates electrically, and is controlled by the weight of the hen.

Other objects and advantages will appear in the following specification, and the novel features of my invention will be particularly pointed out in what I hereinafter claim.

My invention is illustrated in the accompanying drawing forming a part of this application, in which:

Figure 1 is a front elevation of the device, portions thereof being broken away for clarity;

Figure 2 is a section along the line 2—2 of Fig. 1;

Figure 3 is a view similar to Figure 2, but shows the device in operative position;

Figure 4 is a wiring diagram;

Figure 5 is a longitudinal section through a portion of the device;

Figure 6 shows another part of the device; and

Figure 7 shows a view of the nest in operative position.

In carrying out my invention, I provide a nest, indicated generally at A. The nest is disposed above an egg chute B, and this chute is divided into a number of compartments, each being large enough to accommodate one egg. The nest is so supported as to close the open bottom when a hen is in the nest. The bottom is automatically opened when the hen jumps out of the nest, and the newly laid egg is permitted to roll into one of several egg receiving compartments. Each egg in moving through the chute actuates an electrical contrivance which drops a partition behind the preceding egg.

I will first set forth the novel construction of the nest, and will then describe how the eggs are automatically kept separated from each other, each being confined in an individual compartment.

The nest A comprises the nest proper 1, which is supported by a ring 2, and is connected therewith by springs 3. Uprights 4 carry the ring.

The bottom of nest 1 has an opening 5 therein, and also carries downwardly depending members 6. The latter actuate levers 7 which have their adjacent ends designed to close the opening 5, as shown in Fig. 7. The springs 3 are light enough to permit the nest to move downwardly when a hen is in the nest. The inner ends 8 of the levers 7 form a false bottom which covers the opening 5. The hen, when jumping from the nest, permits it to move into the position shown in Fig. 1, and the egg will drop through the opening 5 and into the chute B. The chute carries the egg to a plurality of compartments disposed in an inclined trough-shaped member 9. The chute or trough 9 is U-shaped in cross-section, as shown in Fig. 2. A curved runway 10 for the egg is disposed in the trough. The runway has a cork lining 11, or other suitable material to prevent the breaking of the egg.

I dispose at intervals along the trough 9 partitions 12 that are pivotally secured at 13 to the top of levers 14, the latter being pivotally secured at 15 to the trough. The partitions carry projections 16 that rest upon the side of the trough 9. The partitions when in this position cause the lower ends of the levers 14 to extend at a slight angle with respect to the vertical side of the trough. I provide means for moving the levers so as to cause the partitions 12 to drop into the position shown in Fig. 3. This means is electrically operated, and the circuit is closed by an egg passing through the chute B. The circuit is so arranged as to drop a partition between an egg already in the trough 9 and the one just passing from the nest to the trough.

It will be noted in Fig. 1 that I show a weighted trap door 17. The door is forced downwardly by an egg, and comes to a temporary rest upon a contact 18 while the egg is rolling off from the door and onto the runway 11. Fig. 4 shows how a switch 19 is closed by the dropping of the door 17, which closes a circuit from a source of current 20 through a magnet 21.

Reference to Fig. 5 shows that the magnet 21, when energized, releases a pawl 23 from a ratchet 24, so that the ratchet can be advanced one tooth. The ratchet is mounted upon a shaft 25, and this shaft is actuated by a spring housed in a casing 26. The spring is wound by means of a handle 27.

The slight turning of the shaft 25 swings a disk 28 through a small arc which is sufficient to carry a contact finger 29 from one terminal 30 on a fixed disk 31 to an adjacent terminal. The terminals 30 are connected to electro-magnets 22 which are arranged in the trough 9 in operative relation to the various levers 14.

From the foregoing description of the various parts of the device, the operation thereof may be readily understood.

The device when ready for use assumes the position shown in Fig. 1. Each partition is supported by the trough 9, as shown in Fig. 2. The finger 29 is set so that it is at the point X on the disk 31. When an egg drops upon the trap door 17 it will advance the contact 29 from the X terminal to the adjacent terminal 30. It will be noted that the terminal X is grounded, and that it does not connect the current with one of the magnets 22. The egg will roll to the bottom of the runway 11, and will occupy the position shown at Y in Fig. 1. No partition 12 will drop as yet. As soon as another egg is laid, it will close the switch 19, which will cause a current to flow through magnets 21 and 22. The particular magnet energized in this instance will be the magnet 22Z. The magnet will attract the lever 14 and cause it to permit the partition 12 to drop into operative position, which will place the egg Y in a separate compartment. This flow of current takes place before the finger 29 moves from the contact 30 to the next contact. The switch 19 is opened before the finger 29 reaches the next terminal 30.

This operation is repeated for each egg laid, and it will be seen that each egg is automatically confined in a separate compartment, and is also carried away from the nest.

In the wiring diagram, I have shown the magnet 21 in electrical connection with a ring 32 carried by the movable disk 28. A shoe 33 rides upon the ring 32. There is a magnet 22 for each partition 12.

Although I have shown and described one embodiment of my invention, it is to be understood that the same is susceptible of various changes, and I reserve the right to employ such changes as may come within the scope of the invention as claimed.

I claim:

1. A hen's nest having an opening in the bottom thereof, yielding means supporting said nest and permitting a downward movement thereof when the nest supports a hen, means actuated by the downward movement of said nest for temporarily closing the opening, and an inclined egg receiving member communicating with the opening, partitions carried by said egg receiving member for separating each egg from all other eggs, and electrically controlled means put into operation by an egg leaving the nest for successively dropping said partitions.

2. A hen's nest having a yielding support and an opening in the bottom thereof, means for closing the opening when the nest is weighted down by a hen, an egg receiving member in communication with the opening, partitions carried by said member, electrically controlled means for successively moving said partitions into operative position, and a switch controlled by the eggs dropping from the nest for energizing said electrical means.

3. In an egg holding device, an inclined member for causing eggs to roll therealong by gravity, a plurality of partitions carried by said member for separating the eggs one from another, and electrically controlled means for successively dropping said partitions into operative position.

4. In an egg holding device, an inclined member for causing eggs to roll therealong by gravity, a plurality of partitions carried by said member for separating the eggs one from another, and electrically controlled means for successively dropping said partitions into operative position, said means including magnets, and levers actuated by the magnets when the latter are energized for swinging the partitions.

5. In an egg-holding device of the character described, an inclined runway, a lever pivoted to one edge thereof, a partition pivoted to the lever and extending crosswise of the runway and having its free end supported on the other edge and means actuated by a moving egg for operating the lever and causing the partition to drop.

ALFRED E. PRARAT.